US005481144A

United States Patent [19]
Dunfield et al.

[11] Patent Number: 5,481,144
[45] Date of Patent: Jan. 2, 1996

[54] WIRE GUIDE AND ADHESIVE RETAINING RING FOR DISC DRIVE SPINDLE MOTOR

[75] Inventors: John C. Dunfield, Santa Cruz; Steven C. Knoche, Corralitos; Klaus D. Kloeppel, Watsonville, all of Calif.

[73] Assignee: Seagate Technology, Inc., Scotts Valley, Calif.

[21] Appl. No.: 253,757

[22] Filed: Jun. 3, 1994

[51] Int. Cl.$^6$ .................................................. H02K 11/00
[52] U.S. Cl. .................................... 310/71; 360/99.08
[58] Field of Search ................................. 360/99.04, 99.08, 360/99.09, 99.11; 310/51, 71, 68 B, 67 R

[56] References Cited

U.S. PATENT DOCUMENTS

| | | | |
|---|---|---|---|
| 4,965,476 | 10/1990 | Lin | 310/51 |
| 5,047,677 | 9/1991 | Mineta et al. | 310/67 R |
| 5,157,293 | 10/1992 | Escaravage | 310/71 |
| 5,157,295 | 10/1992 | Stefansky et al. | 310/90 |
| 5,194,775 | 3/1993 | Cooper | 310/71 |

Primary Examiner—Robert S. Tupper
Assistant Examiner—Brian E. Miller
Attorney, Agent, or Firm—Westman, Champlin & Kelly

[57] ABSTRACT

A disc drive includes a disc drive motor for rotating a storage disc. The motor includes a motor base which carries a wiring assembly having a plurality of electrical contacts. A rotor hub is rotatably coupled to the base and rotatably carries a storage disc. The rotor hub includes a permanent magnet. A stator assembly includes a plurality of stator windings adapted for operation with the permanent magnet of the rotor hub. A wire guide coupled to the stator assembly positions wires of the stator windings adjacent the electrical contacts of the wiring assembly. The wires are soldered to the contacts after which the wiring guide can be removed. The stator assembly can be "potted" in an adhesive to reduce problems associated with resonant frequency of the disc drive motor. The wire guide acts as a retainer for the adhesive preventing the adhesive from interfering with rotation of the rotatable hub.

15 Claims, 7 Drawing Sheets

WIRE GUIDE AND ADHESIVE RETAINING RING FOR DISC DRIVE SPINDLE MOTOR

BACKGROUND OF THE INVENTION

This invention relates generally to the field of disc drive data storage devices. More specifically, the invention relates to a retaining ring for a spindle motor for spinning the discs on which data is recorded in such a device.

Disc drive data storage devices of the "Winchester" type are well-known in the industry. Such devices utilize rigid discs coated with a magnetizable medium for the storage of digital information in a plurality of circular concentric tracks. This information is written to and read from the discs using a data head mounted on an actuator mechanism which moves the head from track to track across the surface of the disc under control of electronic circuitry. The discs are mounted for rotation on a spindle motor which causes the discs to spin and the surface of the discs to pass under the heads.

Early five ¼ inch Winchester disc drives included a brushless DC spindle motor which was mounted to a base of a drive housing. The actual motor components were outside of the housing and a shaft of the motor projected into the housing where it was coupled to a hub which was used to mount the discs.

As industry demands for smaller sizes of disc drives has lead to the introduction of half-height five and one-quarter inch drives, three and one-half inch, two and one-half inch, 1.8 inch and smaller drives, the size and configuration of the spindle drive motor has also changed. "Pancake" spindle motors have been used which employ an air gap in the motor which was positioned axially to the motor shaft. "In-hub" spindle motors used motor coils and magnets which were located inside the disc carrying hub.

Current and future generations of disc drives continue to shrink from 2.5 inch to 1.8 inch form factors and smaller. However, many of the assembly steps remain manual and require human interaction. For example, stator windings in the spindle motor are manually positioned and conductively attached to form an external connection. Additionally, with such small size drives the stiffness of the assembly becomes an issue because it can lead to undesired resonances which can limit performance of the disc drive.

SUMMARY OF THE INVENTION

The spindle motor of the present invention includes a rotating hub for mounting discs in a disc drive. The rotatable hub includes a magnet and is rotatably coupled to a motor base. The motor base carries a wiring assembly which includes a plurality of electrical contacts. A stator assembly includes a plurality of stator windings and is fixedly coupled to the motor base. A wire guide is coupled to the stator assembly and positions wires of the stator windings adjacent the electrical contacts of the wiring assembly. These wires are soldered to the electrical contacts. In one embodiment, the wire guide is removed from the spindle motor after the wires of the stator windings are soldered to the electrical contacts.

In one embodiment, the stator assembly is somewhat disc-shaped and the wire guide is a ring which conforms to the shape of the stator assembly. The wire guide includes a plurality of slots for carrying wires of the stator windings.

In another embodiment, an adhesive covers a portion of the stator windings. The adhesive acts to stiffen the stator assembly thereby damping the resonance during operation of the spindle motor. The wire guide blocks the adhesive from flowing beyond the edge of the stator assembly where it could interfere with the rotor hub.

DETAILED DESCRIPTION OF THE PREFERRED EMBODIMENTS

Figure 1:
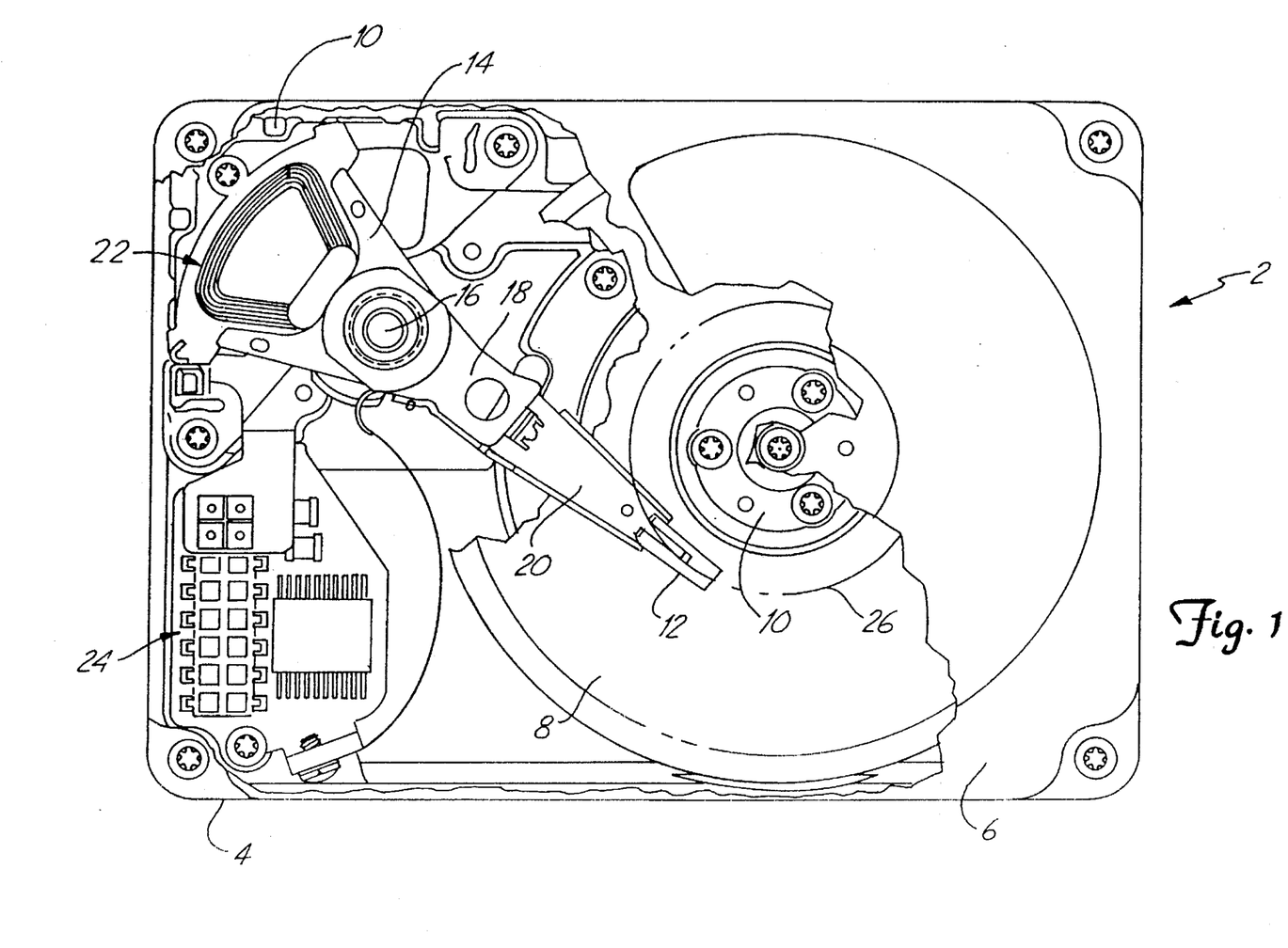
FIG. 1 is a plan view of a disc drive data storage device in which the present invention is useful.

FIG. 1 shows a plan view of a disc drive 2 for use with the present invention. Disc drive 2 includes a base member 4 to which internal components of the unit are mounted. Base member 4 couples to top cover 6 which forms a sealed environment for critical parts of disc drive 2.

Disc drive 2 includes a plurality of discs 8 which are mounted for rotation on a spindle motor, shown generally at 10. A plurality of magnetic read/write heads 12, usually one per disc surface, are mounted to an actuator 14. In the example shown at drive 2, actuator 14 is a rotatory actuator which is mounted for pivoting about a pivot shaft 16. Actuator 14 includes a number of head mounting arms 18 which couple heads 12 to the actuator body via a plurality of load beam/gimbal assemblies 20. Actuator motor 22 is also coupled to actuator body 14 to provide a force to move heads 12 to a desired position on the surface of disc 8.

In operation, the spindle motor 10 causes disc 8 to rotate. Electronic circuitry 24 energizes actuator motor 22 causing actuator 14 to rotate about pivot 16 whereby magnetic read/write head 12 is moved through an arc radially across the surface of disc 8. Actuator 14 positions head 12 over a concentric track, for example track 26 of disc 8. This allows electronic circuitry 24 to read back or write information at desired locations on disc 8.

Figure 2:
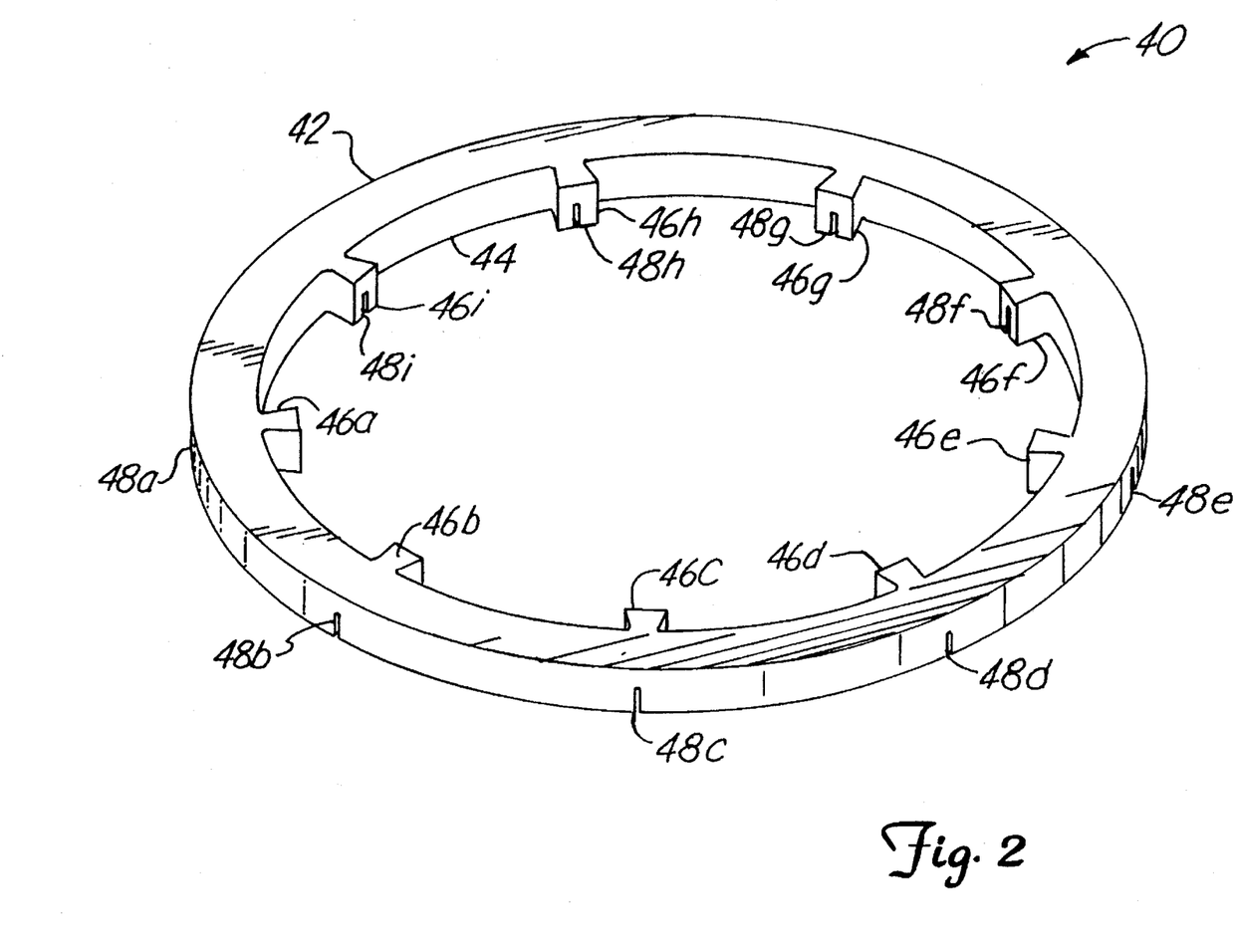
FIG. 2. is a perspective view of a retaining ring in accordance with the present invention.

FIG. 2 is a perspective view of wire guide ring 40 in accordance with the present invention. Wire guide ring 40 is for use in spindle motor 10 as will be described below. Ring 40 includes outer circumference 42 and inner circumference 44 and is adapted for cooperation with a stator assembly (not shown in FIG. 2) of motor 10. Guide ring 40 includes guide structures 46a through 46i. Each guide structure 46a through 46i includes a wire channel 48a through 48i, respectively. Wire channels 48a through 48i are adapted for holding wires of windings carried on the stator assembly (not shown in FIG. 2). Wire guide ring 40 is constructed of a plastic or a metal, or hybrid of these materials, but is not limited to these.

Figure 3:
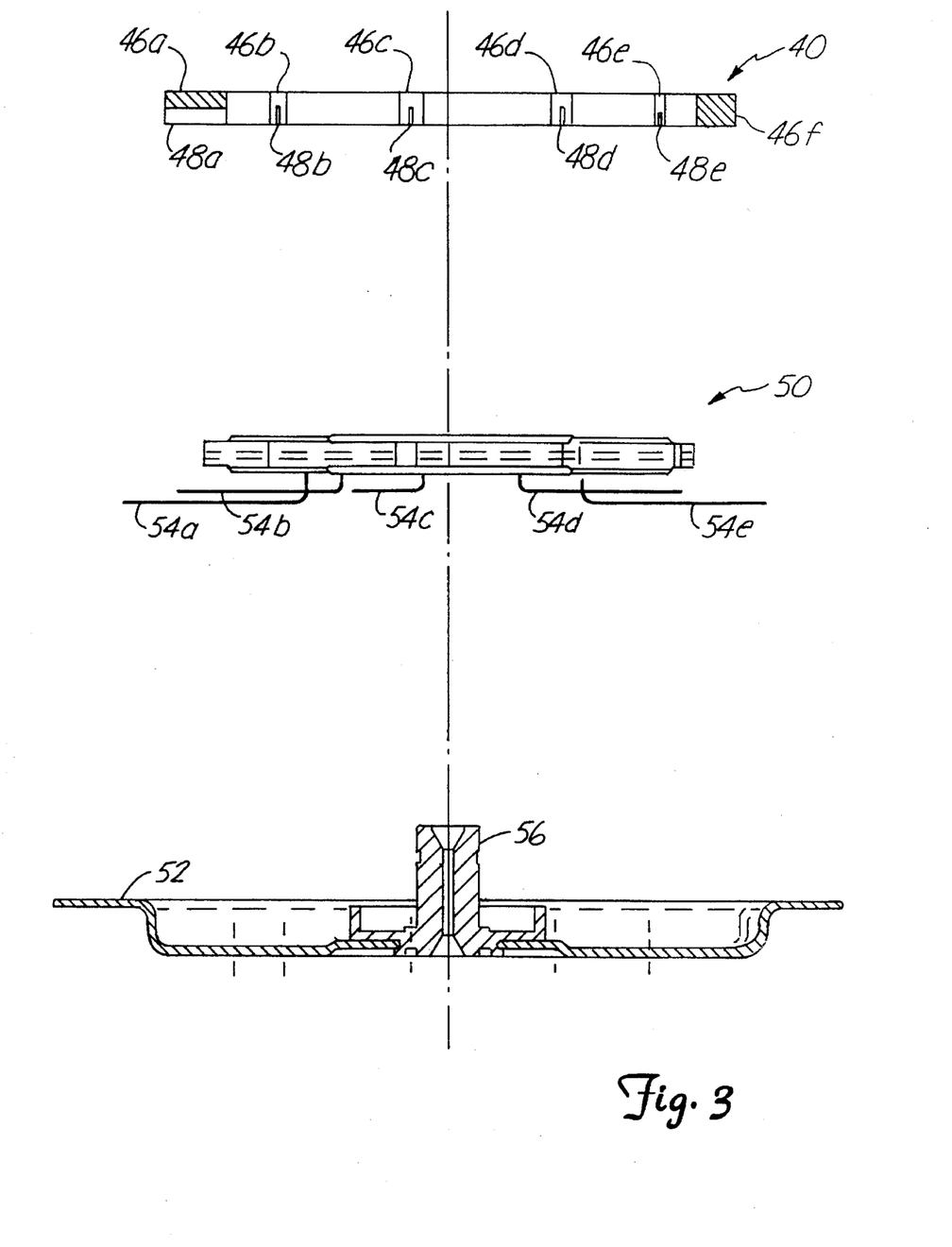
FIG. 3 is an exploded side plan view of a retaining ring, stator assembly and motor base in accordance with the invention.

FIG. 3 is an exploded side plan view of wire guide ring 40, stator assembly 50 and motor base 52. Stator assembly 50 includes a plurality of stator windings or coils and stator slots (not shown in detail in FIG. 3). Each stator winding includes a stator wire 54. Stator wires 54 are individually held in wire channels 48 in each guide structure 46 of wire guide ring 40. The guide ring 40 and stator assembly 50 are placed in motor base 52 which includes a drive shaft 56 and a wiring harness (not shown in FIG. 3). When properly positioned, each wire channel 48 positions each wire 54 of the stator windings over the appropriate electrical contact on the wiring harness or electrical connections. The wire 54 is then soldered or otherwise electrically connected to the wiring harness.

Figure 4:
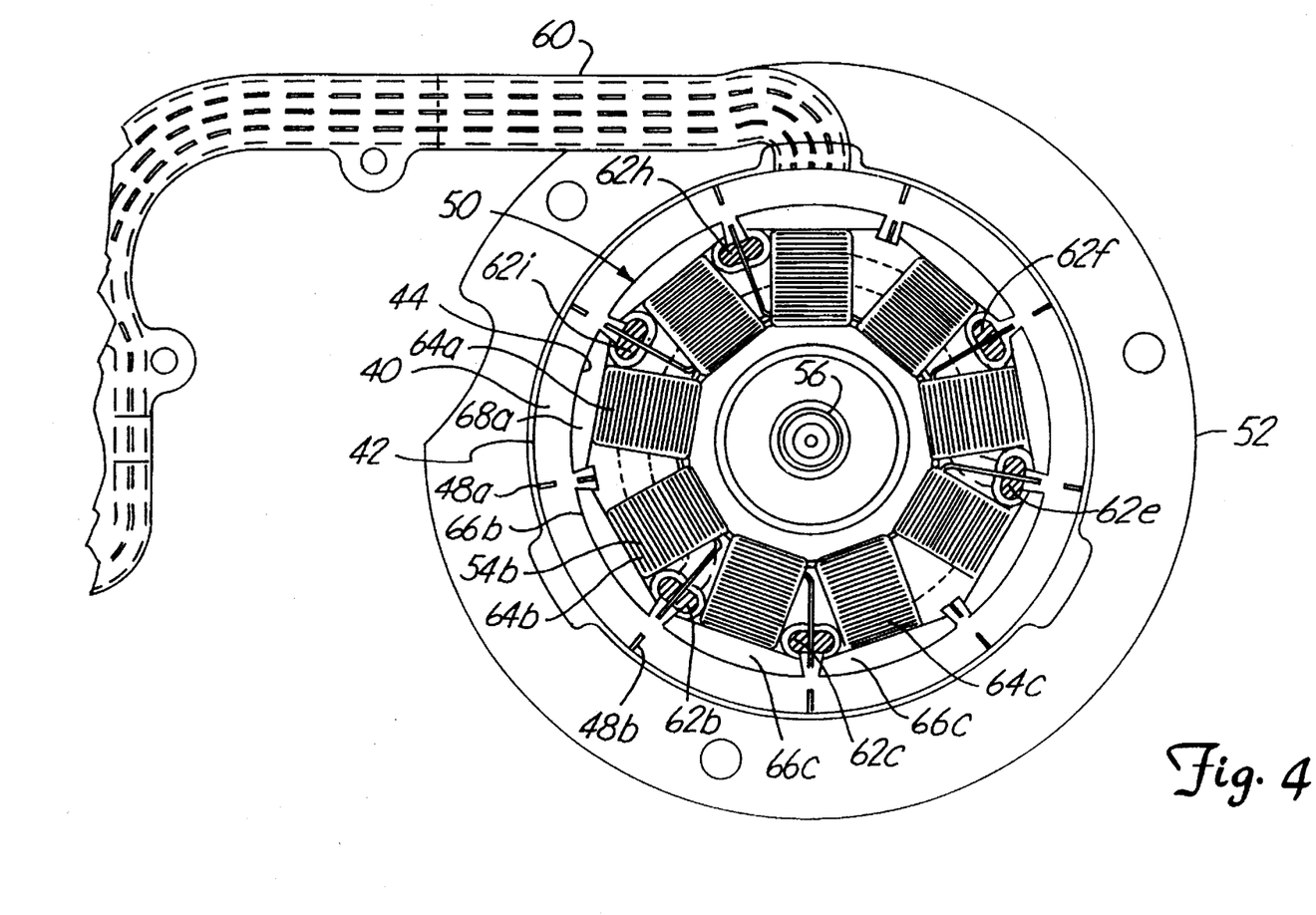
FIG. 4 is a top plan view of the stator assembly, retaining ring and base plate of FIG. 3.

FIG. 4 shows a top plan view of wire guide ring 40 assembled with stator assembly 50 and motor base 52. FIG. 4 also shows wiring harness 60 which includes electrical contacts 62b, 62c, 62e, 62f, 62h and 62i. Stator assembly 50 includes stator windings 64a through 64i and stator slots 66a through 66i which are radially spaced around the axis of stator assembly 50. Each winding 64a through 64i is formed from a stator wire 54a through 54i, respectively. As shown in FIG. 4, wires 54b, 54c, 54e, 54f, 54h and 54i are held in their respective wire channels of guide ring 40. The wire channel is positioned at the appropriate stator wire position over contact 62b, 62c, 62e, 62f, 62h or 62i of wiring harness 60 and are soldered thereto. Inner circumference 44 of retaining ring 40 is designed to fit over stator slots 66. Spacing between adjacent stator slots 66 provide room for guide structure 46 and wire channel 48.

Figure 5:
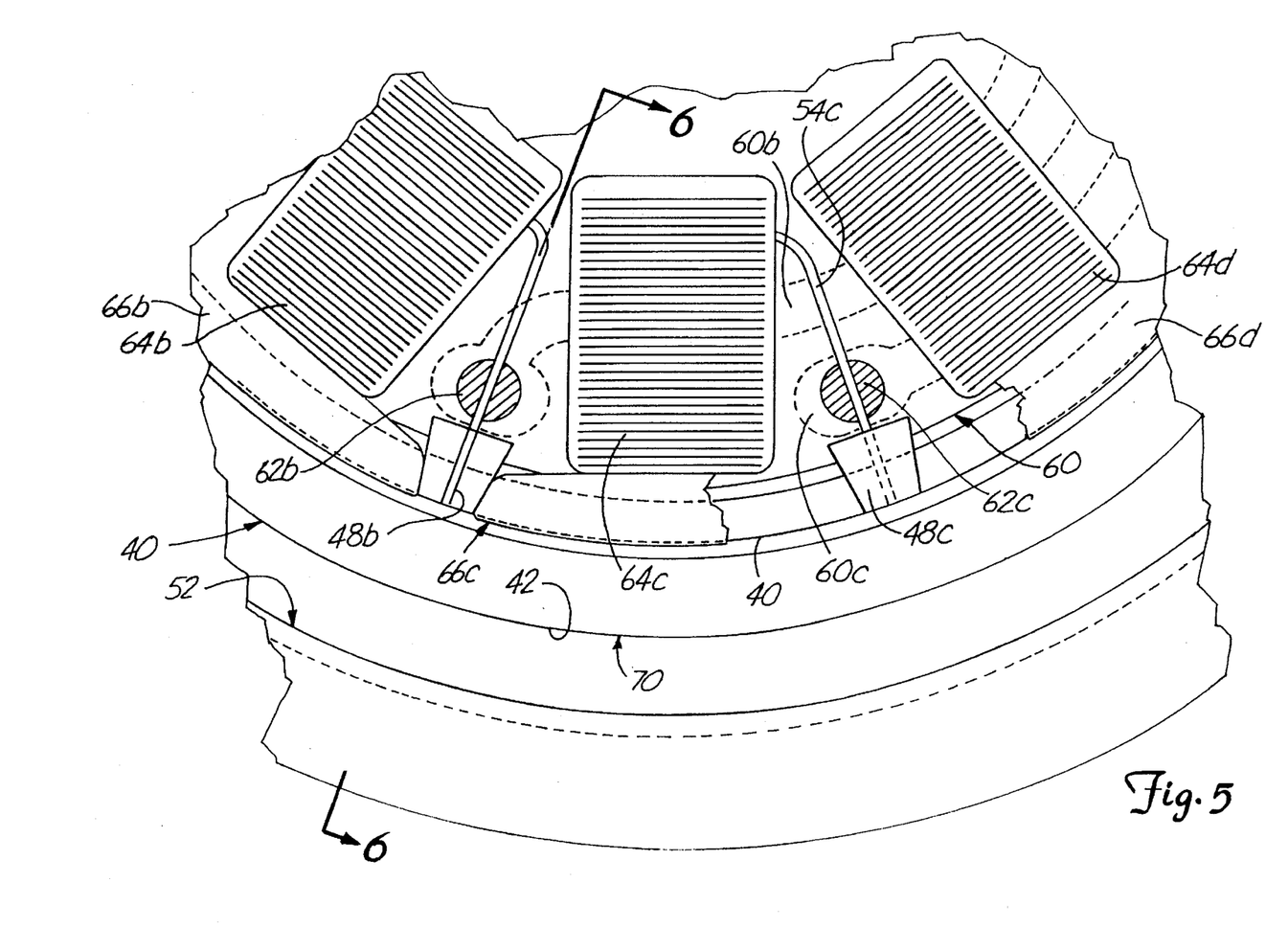
FIG. 5 is a cut away top plan view of the stator assembly, base plate and non-removable retaining ring.

FIG. 5 is a detailed view of a portion of a non-removable wire guide which shows stator windings 64b through 64d. In FIG. 5, individual wires 60b and 60c of wiring harness 60 are shown in phantom. Wires 60b and 60c are soldered to stator wires 54b and 54c of harness 50 at contacts 62b and 62c, respectively. FIG. 5 also shows permanent magnet 70 which is carried in around outer circumference 42 of a rotor hub (not shown in FIG. 5).

Figure 6:
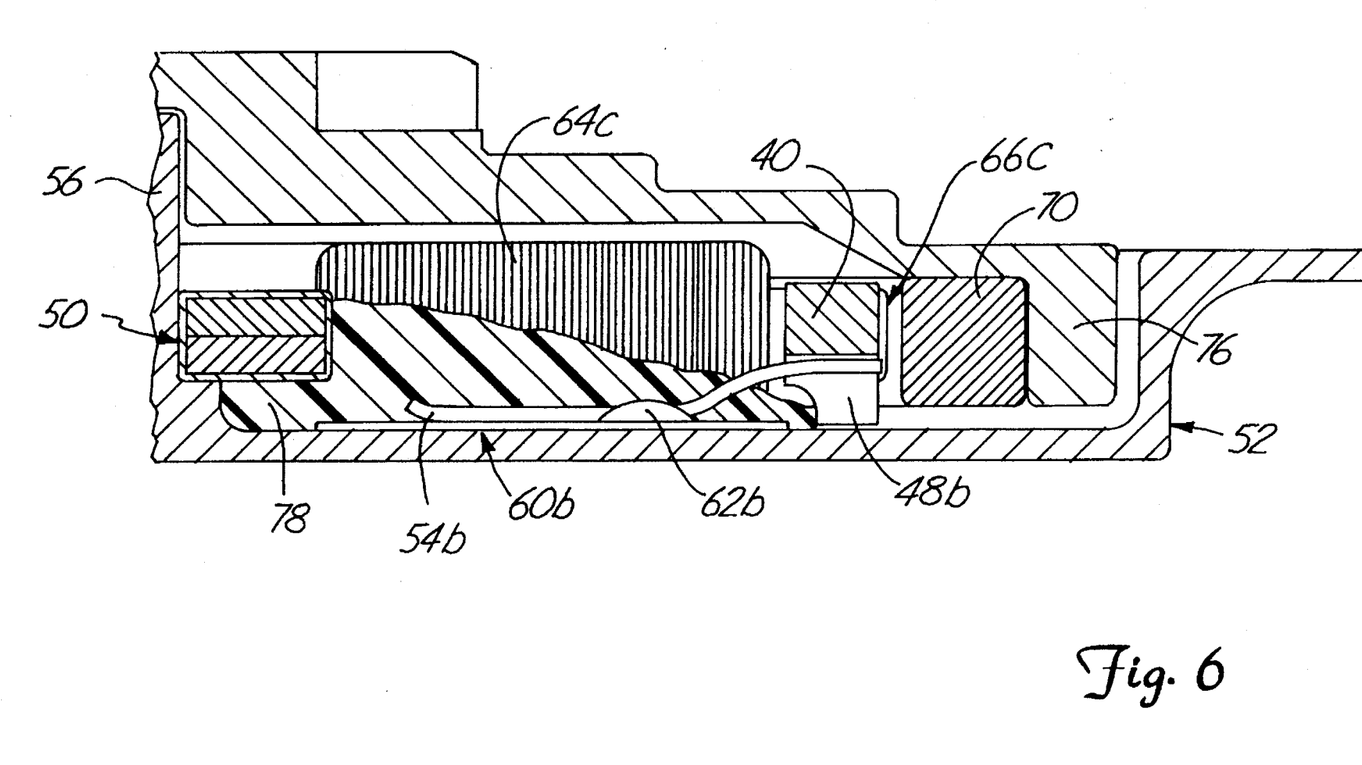
FIG. 6 is a side cross-sectional view taken along line 6—6 of FIG. 5 and showing a rotor hub of the disc drive motor.

FIG. 6 is a cross-sectional view of FIG. 5 taken the line labeled 6—6. FIG. 6 shows stator winding 64c on stator assembly 50. FIG. 6 also shows wire 54b of winding 64b (not shown in FIG. 6) connected to soldered contact 60b. Wire guide ring 40 holds wire 54b in wire channel 48b. A rotor hub 76 is rotatably carried on drive shaft 56 by bearings. Rotor hub 76 carries magnetic storage disc 8 (shown in FIG. 1). Interaction between stator coils 64 of stator assembly 50 and permanent magnet 70 cause rotor hub 76 to rotate thereby rotating disc 8.

FIG. 6 also shows adhesive 78 which covers stator windings 64. Adhesive 78 acts to rigidly bond stator assembly 50 to motor base 52. In addition to its function as a wire guide, ring 40 acts to block the flow of adhesive 78 beyond the outer circumference of stator assembly 50. This prevents adhesive 78 from interfering with the rotation of rotor hub 76. Adhesive 78 strengthens the structure of stator assembly 50 and motor base 52 thereby increasing its resonant frequency and damping its response. This provides for more stable disc operation and reduces reading and writing errors because of vibrations in drive 2.

In one embodiment of the invention, wire guide 40 is removed following the soldering of wires 54 to contacts 60. Following removal of wire guide 40, rotor hub 76 is assembled for normal operation. The use of ring 40 ensures that wires 54 are properly placed over contacts 62 which reduces the required manual labor. Additionally, as the location of wires 54 and contacts 62 are known, the soldering process can be automated thereby further reducing manual labor. This reduction in human interaction decreases the cost of the overall disc drive and improves yields. In a subsequent operation, which could be automated, a flat blade cuts off the end of wire 54 which is between contact 60 and guide ring 40.

In another embodiment of the invention, the guide ring is not removed from the stator assembly and is used as a retaining ring to prevent the flow of an adhesive in which windings 64 of stator assembly 50 are potted. Following application of adhesive 78, it may be possible to remove ring 40. Ring 40 can be used as an adhesive retaining ring whether or not it is also used as a wire guide. The spacing between ring 40 and motor base 52 should be small enough to prevent the flow of adhesive between ring 40 and base 52. This is determined by the type of adhesive used and the viscosity of the adhesive. In a preferred embodiment, the adhesive is Chemseal 4x464C. In one embodiment, adhesive 78 comprises a single component acrylic UV cure or epoxy UV cure adhesive available from Chemitech, Inc., of Tokyo, Japan.

In another embodiment of the invention, ring 40 is attached to, or formed from, motor base 52 and used to retain the flow of adhesive 78 beyond the outer rim of stator assembly 50.

Figure 7:
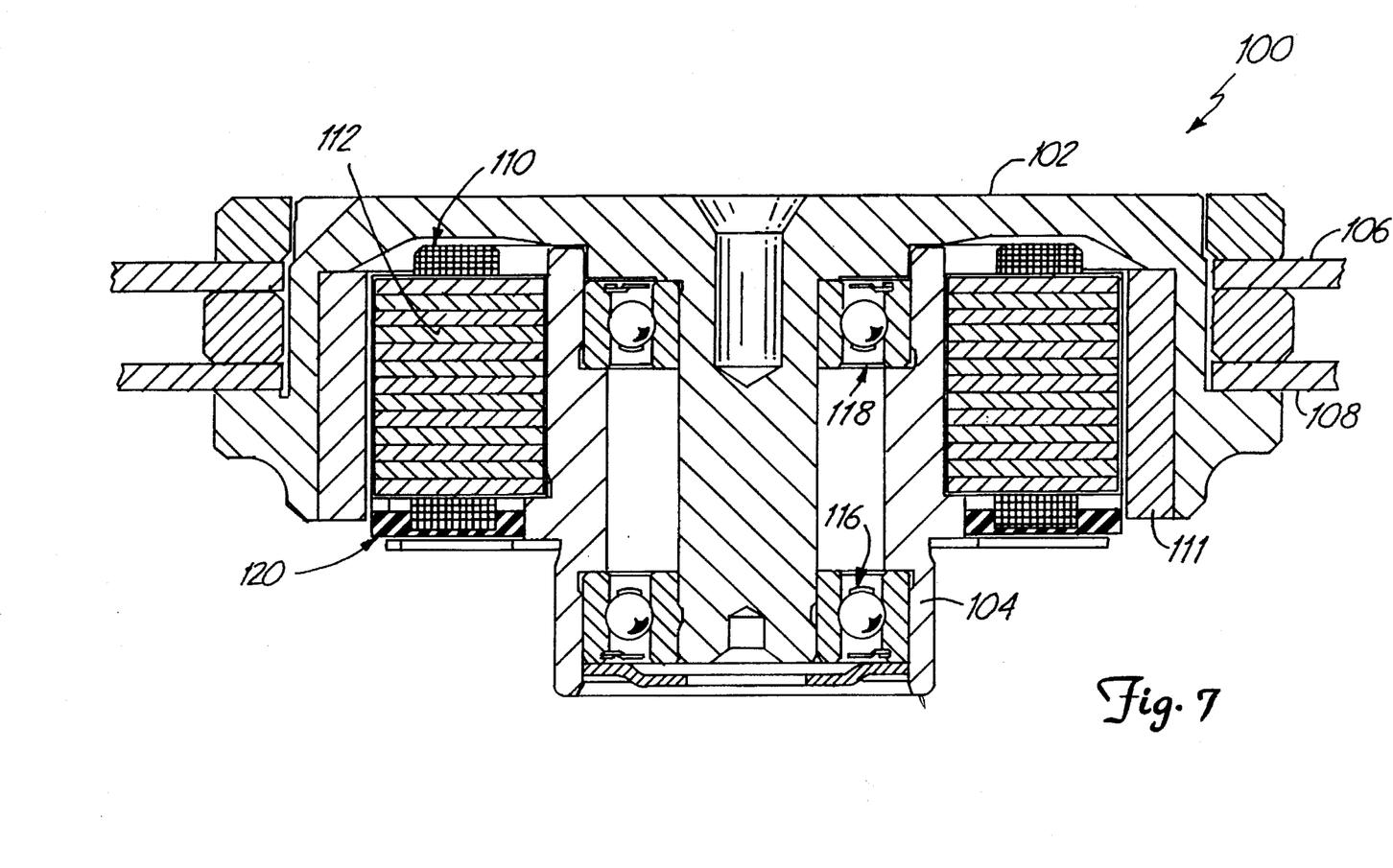
FIG. 7 is a cross-sectional view of a disc drive motor in accordance with another embodiment of the present invention.

FIG. 7 is a cross-sectional view of a disc drive motor 100 in accordance with another embodiment of the invention. Disc drive motor 100 is an "in-hub" type design and shows a drive motor in which the stator wiring connections are not coupled to the base. Motor 100 includes rotor 102 and sleeve 104 which rotatably carries rotor 102. Rotor 102 carries discs 106 and 108, and is rotatably coupled to sleeve 104 through bearings 116 and 118. A stator assembly 110 is carried in motor 100 and interacts with permanent magnet 111 carried on rotor 102 thereby causing the rotation of rotor 102. Stator assembly 110 includes stator winding 112 having a wire which is electrically connected to wiring assembly 120. Typically, wiring assembly 120 is a flexible printed circuit or printed circuit board having a contact similar to contact 62 described above.

In this embodiment of the invention, the wire guide ring operates as described above and fits around stator assembly 110. The retaining ring positions the stator wire adjacent contacts carried in circuit board 120 during soldering of the connection. Once the connection is soldered, the retaining ring is removed and motor 100 is assembled as shown in FIG. 7.

Although the present invention has been described with reference to preferred embodiments, workers skilled in the art will recognize that changes may be made in form and detail without departing from the spirit and scope of the invention. For example, the invention can by used with different size disc drive assemblies and is not limited to the shapes shown in the figures. Further, the invention can be used in both stationary shaft and rotating shaft motors and "below hub" or "in hub" designs. Additionally, the wires may be connected to any suitable contact or connection other than the desired harness. In the figures, the position of the electrical contact has been illustrated as between the stator windings. However, it is to be understood that the contact could be in any appropriate position relative to the stator assembly, including outside the outer diameter of the stator assembly or inside the inner diameter of the stator assembly in, for example, a stationary shaft-type motor design.

What is claimed is:

1. A disc drive motor for use in a disc drive for storing information, comprising:

a motor base;

a wiring assembly having a plurality of electrical contacts;

a rotor rotatably coupled to the base for rotatably carrying a storage disc;

a magnet coupled to the rotor;

a stator assembly having an outer radius including a plurality of stator windings; and wire guide ring coupled to the stator assembly having a guide structure adjacent each stator winding to position wires of the stator windings adjacent the electrical contacts, the wire guide ring encompassing the outer radius of the stator assembly wherein the stator assembly is positioned within a circumference of the wire guide ring.

2. The disc drive motor of claim 1 wherein the guide structure of the wire guide ring includes openings for receiving the wires of the stator windings thereby positioning the wires.

3. The disc drive motor of claim 1 including an adhesive covering portions of the stator assembly and the wire guide ring further blocks the adhesive from flowing beyond the wire guide.

4. The disc drive motor of claim 1 wherein the motor has a stationary shaft.

5. The disc drive motor of claim 1 wherein the motor has a rotating shaft.

6. The disc drive motor of claim 1 wherein the wire guide ring is integral with the motor base.

7. The disc drive motor of claim 1 wherein the guide structure is positioned between adjacent stator windings and extends radially inward from the wire guide.

8. The disc drive motor of claim 7 wherein the guide structure includes an open wire guide channel which receives a wire of the stator windings.

9. A disc drive motor for use in a disc drive for storing information, comprising:

a motor base;

a rotor rotatably coupled to the base for rotatably carrying a storage disc;

a magnet coupled to the rotor;

a stator assembly having an outer radius including a plurality of stator windings;

an adhesive at least partially covering the stator assembly and the motor base thereby adhering the stator assembly to the motor base and providing increased stiffness; and an adhesive retaining ring adjacent an outer circumference of the stator assembly thereby blocking flow of the adhesive beyond the retaining ring and preventing the adhesive from interacting with the rotor, the adhesive retaining ring further having a guide structure adjacent each stator winding to position wires of the stator windings encompassing the outer radius of the stator assembly wherein the stator assembly is positioned within a circumference of the adhesive retaining ring.

10. The disc drive motor of claim 9 wherein the motor has a stationary shaft.

11. The disc drive motor of claim 9 wherein the motor has a rotating shaft.

12. The disc drive motor of claim 9 wherein the ring is integral with the motor base.

13. The disc drive motor of claim 9 including a wiring assembly having a plurality of electrical contacts, wherein the adhesive retaining ring further provides a wire guide opening to position wires of the stator windings adjacent electrical contacts of a wiring assembly.

14. The disc drive motor of claim 13 wherein the guide structure is positioned between adjacent stator windings and extends radially inward from the adhesive retaining ring.

15. The disc drive motor of claim 14 wherein the guide structure includes an open wire guide channel which receives a wire of the stator windings.

* * * * *

UNITED STATES PATENT AND TRADEMARK OFFICE
CERTIFICATE OF CORRECTION

PATENT NO. : 5,481,144

DATED : January 2, 1996

INVENTOR(S) : John C. Dunfield, Steven C. Knoche and Klaus D. Kloeppel

It is certified that error appears in the above-indentified patent and that said Letters Patent is hereby corrected as shown below:

On the Title page, item [56], References Cited;

Please insert the following:

```
3,874,073   4/75   Dochterman et al.   310/43
4,481,435   11/84  Loforese            310/71
5,241,229   8/93   Katakura et al.     310/51
5,256,922   10/93  Tanaka et al.       310/71
5,268,604   12/93  Katakura            310/71
5,291,649   3/94   Lombardi et al.     310/71
5,386,164   1/95   Butcher et al.      310/71
```

In col. 5, line 4, before "wire" insert --a--.

Signed and Sealed this

Twenty-third Day of April, 1996

Attest:

BRUCE LEHMAN

Attesting Officer

Commissioner of Patents and Trademarks